United States Patent
Biermann et al.

(10) Patent No.: US 9,322,467 B2
(45) Date of Patent: Apr. 26, 2016

(54) INSERT SHAFT SYSTEM, DIFFERENTIAL WITH INSERT SHAFT SYSTEM, OIL DISTRIBUTION IN SHAFT SYSTEMS OF TRANSMISSIONS, AND STEEL OIL DRIP PAN FOR THE OILING OF A SHAFT

(71) Applicant: Schaeffler Technologies GmbH & Co. KG, Herzogenaurach (DE)

(72) Inventors: Thorsten Biermann, Wachenroth (DE); Harald Martini, Herzogenaurach (DE); Inaki Fernandez, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/406,996

(22) PCT Filed: May 13, 2013

(86) PCT No.: PCT/EP2013/059818
§ 371 (c)(1),
(2) Date: Dec. 10, 2014

(87) PCT Pub. No.: WO2014/029513
PCT Pub. Date: Feb. 27, 2014

(65) Prior Publication Data
US 2015/0159745 A1 Jun. 11, 2015

(30) Foreign Application Priority Data
Aug. 20, 2012 (DE) .......................... 10 2012 214 771

(51) Int. Cl.
*F16H 57/04* (2010.01)
*F16H 57/00* (2012.01)
*F16H 48/38* (2012.01)
*F16H 48/40* (2012.01)
*F16H 48/10* (2012.01)

(52) U.S. Cl.
CPC ............ *F16H 57/0482* (2013.01); *F16H 48/38* (2013.01); *F16H 57/0025* (2013.01); *F16H 57/0427* (2013.01); *F16H 57/0486* (2013.01); *F16H 48/40* (2013.01); *F16H 2048/106* (2013.01)

(58) Field of Classification Search
None
See application file for complete search history.

(56) References Cited

U.S. PATENT DOCUMENTS

| | | | | |
|---|---|---|---|---|
| 3,785,458 A | * | 1/1974 | Caldwell ................ | B60R 17/00 184/11.1 |
| 5,005,437 A | * | 4/1991 | Furer ...................... | F16N 39/06 184/6.24 |
| 5,131,498 A | * | 7/1992 | Kato ...................... | F16H 57/043 184/6.12 |
| 5,154,517 A | * | 10/1992 | Hodge ................. | F16C 33/4623 384/470 |
| 5,989,143 A | | 11/1999 | Bell et al. | |
| 6,318,501 B1 | * | 11/2001 | Udou ................... | F16H 57/0426 184/6.12 |

(Continued)

FOREIGN PATENT DOCUMENTS

| | | |
|---|---|---|
| DE | 19633586 A1 | 2/1998 |
| DE | 60001123 T2 | 5/2003 |

(Continued)

*Primary Examiner* — Dirk Wright
(74) *Attorney, Agent, or Firm* — Simpson & Simpson, PLLC

(57) ABSTRACT

A plug-in shaft system comprising a hollow stub shaft inside of which a shaft is put to transmit torque, a sealing cap being fastened to a front end of the hollow stub shaft to seal the interior of the hollow stub shaft from the passage of oil, and an oil guiding cap being fastened to the front of the hollow stub shaft at an axial distance to the oil sealing cap, the oil guiding cap defining an oil guiding space. A differential, such as a straight differential, including the plugin shaft system, wherein preferably two sun gears are used.

11 Claims, 5 Drawing Sheets

(56) References Cited

U.S. PATENT DOCUMENTS

2002/0036120 A1    3/2002  Omote et al.
2011/0303037 A1*  12/2011  Doleschal ........... F16H 57/0426
                                                        74/467
2012/0240708 A1*   9/2012  Voth ...................... F16H 57/043
                                                        74/467

FOREIGN PATENT DOCUMENTS

| DE | 102006000080 A1 | 9/2006 |
| DE | 102009055005 A1 | 9/2010 |
| EP | 0362043 A1 | 4/1990 |
| EP | 1031766 A2 | 8/2000 |

\* cited by examiner

INSERT SHAFT SYSTEM, DIFFERENTIAL WITH INSERT SHAFT SYSTEM, OIL DISTRIBUTION IN SHAFT SYSTEMS OF TRANSMISSIONS, AND STEEL OIL DRIP PAN FOR THE OILING OF A SHAFT

CROSS-REFERENCE TO RELATED APPLICATIONS

The present application is the United States National Stage Application pursuant to 35 U.S.C. §371 of International Application No. PCT/EP2013/059818, filed on May 13, 2013, which application claims priority from German Patent Application No. DE 10 2012 214 771.3, filed on Aug. 20, 2012, which applications are incorporated herein by reference in their entireties.

DESCRIPTION

1. Field of the Invention

The invention relates generally to an insert shaft system, having a hollow shaft stub, wherein a shaft is inserted into the interior thereof in a torque transmitting manner, wherein a seal cap is attached on an end face of the hollow shaft stub, sealing the interior of the hollow shaft stub in a manner preventing the flow of oil through the same.

2. Background of the Invention

A differential arrangement having lubrication feed lines is known from the prior art, for example, U.S. Pat. No. 5,989,143 (Bell et al.). A hollow shaft having oil channels is known from European Patent No. EP 0362043 A1 (Hubert et al.). Lubrication devices for transmissions are also known from European Patent No. EP 1 031 766 B1 (Udou) and German Patent No. DE 600 01 123 T2 (Udou et al.). Transmissions and oil feed mechanisms for a power transmission device are known from German Patent Application Publication No. DE 10 2006 000 080 A1 (Usami et al.) and German Patent Application Publication No. DE 10 2009 055 005 A1 (Takeuchi et al.).

The known systems, however, have disadvantages pertaining to the exploitation of the constructed space, the ease of assembly, the cost-efficiency thereof, and the seal which they achieve.

BRIEF SUMMARY OF THE INVENTION

According to aspects illustrated herein, there is provided an insert shaft system including a hollow shaft stub having an interior and an end face, a shaft inserted into the interior of the hollow shaft stub in a torque transmitting manner, a seal cap attached on the end face of the hollow shaft stub, the seal cap operatively arranged to seal the interior of the hollow shaft stub to prevent a flow of oil through the same and an oil distributor cap attached at an axial distance from the seal cap on the end face of the hollow shaft stub, the oil distributor cap and the seal cap forming an oil distribution chamber.

According to aspects illustrated herein, there is provided an insert shaft system of the class, in that an oil distributor cap is attached, at an axial distance from the seal cap, on the end face of the hollow shaft stub, forming an oil distribution chamber. In an example embodiment, the oil distributor cap is fixed in the hollow shaft stub, or is attached in a manner surrounding the hollow shaft stub. In this way, it is possible on the one hand to realize a very compact construction, and on the other to provide a unit which is particularly simple to install.

In order to achieve a particularly good lubrication, it is advantageous if at least one oil channel flows into the oil distribution chamber, or if a plurality of oil channels flows into the same, the oil channels preferably being parallel to each other.

It is also advantageous if the oil distributor cap has a funnel-like depression which is preferably arranged in the center thereof. In this manner, oil can easily be fed to a further hollow shaft, particularly if the funnel-like depression flows into a tube which is inserted into the other hollow shaft.

The conveyance of fluid is also facilitated if the depression flows into an oil outlet opening.

It is further advantageous if the oil distribution chamber is designed as a gap, and particularly an annular gap, which is preferably produced by spacer elements which are pushed through axially in the direction of the end face of the hollow shaft stub.

A configuration in which the oil distributor cap is made of a metallic material such as steel has been demonstrated particularly durable and particularly able to accept loads.

It is also advantageous if the hollow shaft stub and the shaft—the same preferably designed as a solid shaft—are connected to each other via a toothing, in a positive- and/or force-fitting manner. In this way, it is possible to easily implement a transmission of torque, and also to simplify the assembly thereof.

The possible applications are increased in number if the hollow shaft stub is part of a sun gear, by the shaft being configured in the manner of a sun gear shaft.

The invention also relates to a differential, such as a spur gear differential, having an insert shaft system, wherein two sun gears are preferably used in the same.

It is also advantageous if there is a depression in the oil distributor cap at the end face of the oil channel, the depression oriented in this direction, or the oil distributor cap has at least three projections which are evenly distributed on the inside thereof, such that there is a space between the end of the oil channel and the oil distributor cap. This space can then be used to achieve a particularly efficient oil distribution. This configuration prevents a blunt face placement of the oil distributor cap, and an associated sealing of the oil channels.

It is further advantageous if there is at least one eccentric oil channel in the hollow shaft stub, running at least sectionally in the axial direction.

It is also advantageous if two or more oil channels are arranged on both sides of an axis of rotation. It is possible to simplify the manufacturing process and to improve the lubricating behavior of the insert shaft system in this way.

It is also advantageous if the oil channel has an oil outlet opening on the end face of the hollow shaft stub. The discharge of oil from the oil channel is made efficient in this way.

In one advantageous embodiment, the oil channel has a connection to an oil groove constructed on the outer periphery of the hollow shaft stub, via a connection channel with a radial orientation. As a result, oil can be easily routed via the oil groove to the connection channel, and further on to the oil outlet opening of the oil channel, such that oil is moved into the gap between the seal cap and the oil distributor cap. The oil can then be further routed through the oil outlet opening of the oil distributor cap into the inside of a further hollow shaft.

In order to simplify an efficient movement of oil, it is advantageous if the oil groove has an orientation running in the axial direction.

It is also advantageous if the hollow shaft stub is designed as a sun gear with an outer toothing. In this manner, it is possible to implement a planetary gear step, and thereby also a planetary gear drive.

In order to prevent the individual parts from falling apart, it is advantageous if the shaft is fixed axially in the hollow shaft stub via a snap ring.

The manufacturing process can be simplified if the oil channel and the connection channel are designed as bore holes with a right angle to each other.

It is also advantageous if the oil channels are arranged evenly distributed around the axis of rotation of the hollow shaft stub, and evenly spaced from said axis of rotation.

According to aspects illustrated herein, there is provided an insert shaft system, and particularly also to a plug-in connection between a sun gear shaft and the sun gear sitting thereon. Additionally, there is provided a differential having two sun gears, or to a transfer case having a sun gear and a further central shaft, such as a sun gear, a planetary carrier, or a ring gear.

The oil distributor cap, which could also be termed a cover cap, covers a shaft stump on the end face thereof. The shaft stump is hollow and configured with parallel oil channels in its cylindrical walls. The oil channels flow into a gap between the cover cap—that is, the oil distributor cap—and the end face of the hollow shaft stub. A gap is produced in this case by spacer elements which are pushed through axially in the direction of the end face of the shaft stump.

In other words, the oil distributor cap covers the hollow shaft stub which is configured with at least one oil channel. The oil channel flows into the oil distributor cap. The oil distributor cap which is inserted into the shaft stump, or can sit on the same, tapers like a funnel. The stem of the funnel engages in an oil channel of the shaft stump of a shaft which is positioned axially opposite from the same, or engages in a tube which sits in the opposing shaft. The shafts can rotate with respect to each other.

According to aspects illustrated herein, there is provided a device having a hollow shaft or a hollow shaft section, a further shaft sits in the hollow shaft, or a shaft section sits in the hollow shaft section. An annular gap between the hollow shafts and/or hollow shaft sections is closed off axially by means of a cap which sits in the hollow shaft or in the hollow shaft section on the end faces of both shafts and/or shaft sections. In addition, a further cap, with at least one "funnel opening," sits on the hollow shaft or the hollow shaft section. The further cap collects oil exiting from at least one lubrication channel of the hollow shaft, and conveys the oil to the rest of the system via the funnel opening.

These and other objects, advantages and features of the present invention will be better appreciated by those having ordinary skill in the art in view of the following detailed description of the invention in view of the drawings.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The figures are only presented in schematic form for the purpose of clarifying the invention. Elements which are the same in different drawings are indicated by the same reference numbers.

Figure 1:
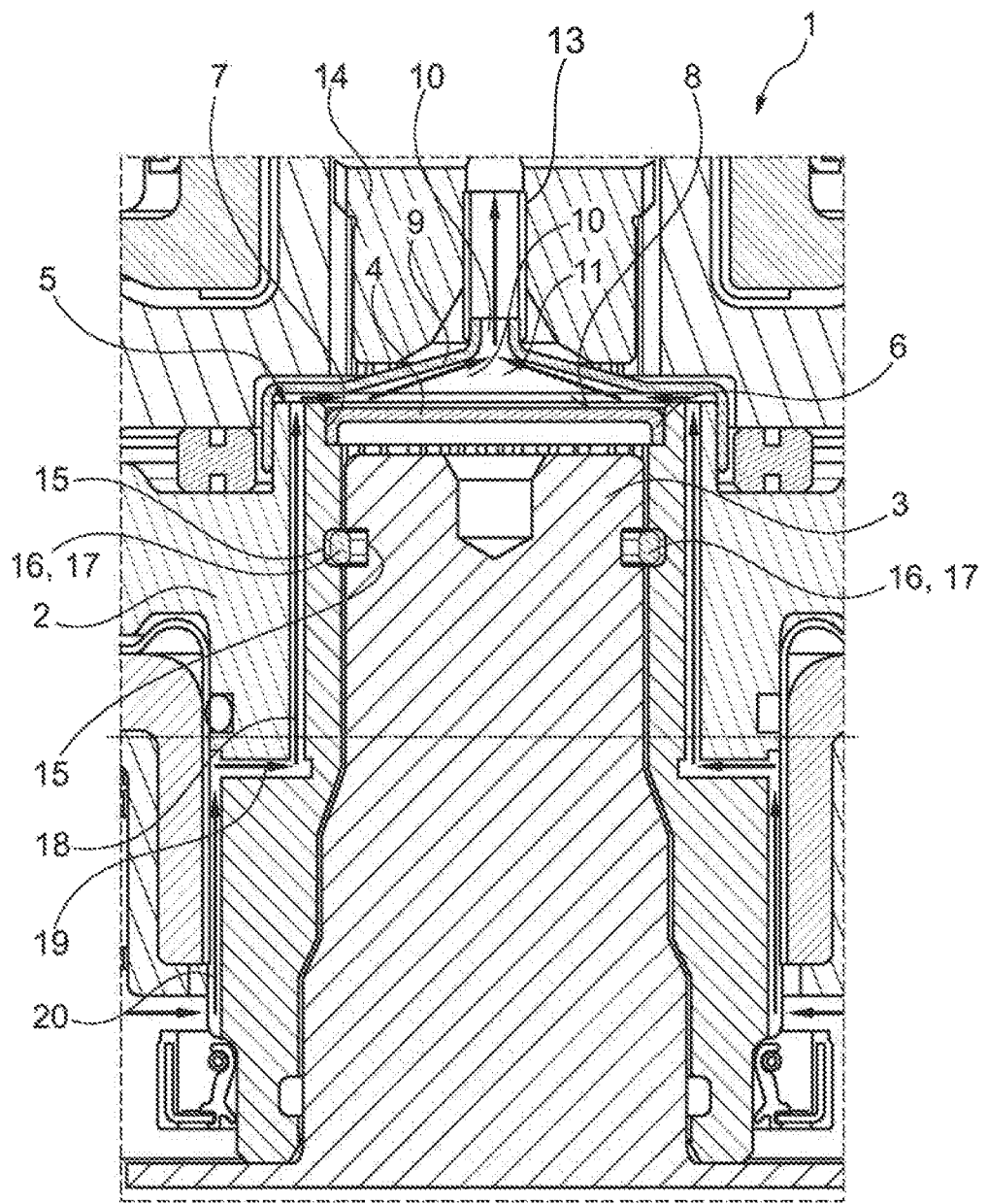
FIG. 1 is a first embodiment of an insert shaft system, in a longitudinal cross-section drawing cut along an axis of rotation of the hollow shaft stub.

A first embodiment of insert shaft system 1 is illustrated in FIG. 1. Insert shaft system 1 has hollow shaft stub 2. Shaft 3 which is constructed as a solid shaft is inserted into the interior of hollow shaft stub 2.

Seal cap 4 is attached on end face 5 of hollow shaft stub 2. Seal cap 4 has end flange 6 which sits flush with inner side 7 of hollow shaft stub 2, sealing against the same. End face 8 of seal cap 4 is arranged axially inside hollow shaft stub 2, or at least is oriented to sit flush with end face 5 of hollow shaft stub 2.

Oil distributor cap 9 is constructed with an axial spacing from seal cap 4. Oil distributor cap 9 and seal cap 4 form oil distribution chamber 10. Oil distributor cap 9 also has funnel-like depression 11 which transitions into oil outlet opening 12.

Oil distributor cap 9 is inserted in tube 13 which, in turn, is inserted in hollow shaft 14, which, in turn, is able to rotate, particularly relative to hollow shaft stub 2.

A toothing is constructed as a wedge toothing on the outer side of shaft 3 and the inner side of hollow shaft stub 2. Hollow shaft stub 2 and shaft 3 are molded to be complementary to each other.

Each of the two elements has groove 15 at the same axial position, in which retaining element 16, in the form of snap ring 17, is included. Shaft 3 is fixed in the axial direction relative to hollow shaft stub 2 via snap ring 17.

Oil channels 18 are constructed in hollow shaft stub 2. Oil channel 18 is connected to oil groove 20 via radially oriented connection channel 19.

Oil groove 20 is constructed on a region of hollow shaft stub 2 which is distant from the end face thereof, and particularly on the outer side, wherein oil groove 20 is oriented in the axial direction.

Oil distributor cap 9 is made of steel. Seal cap 4 is likewise made of steel, but can also be made of plastic. It is also possible that oil distributor cap 9 is made of plastic. Light alloys can also be contemplated for both of the components.

Figure 2:
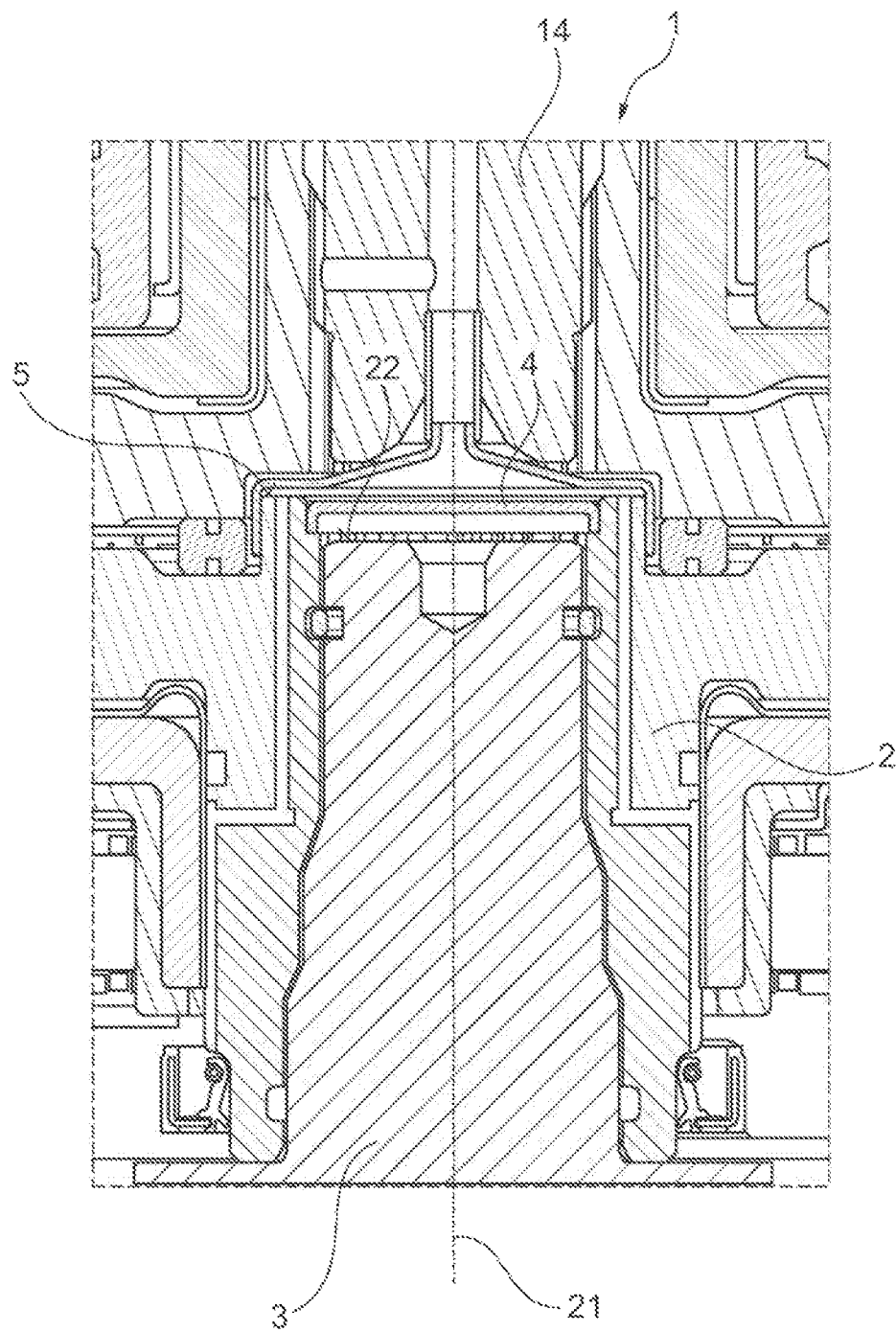
FIG. 2 is a further longitudinal cross-section drawing of an insert shaft system of the invention.
Figure 3:
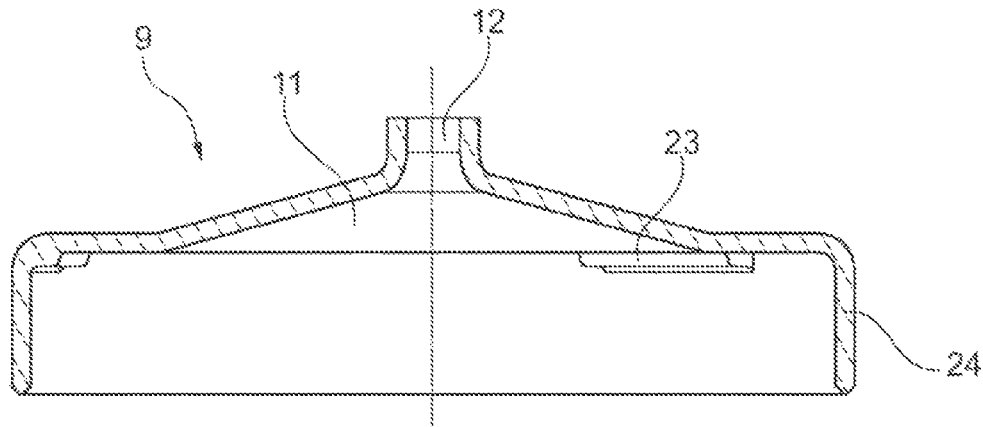
FIG. 3 is a further cross-sectional view of an oil distributor cap used in the insert shaft system shown in FIG. 1 and FIG. 2.
Figures 5, 6:
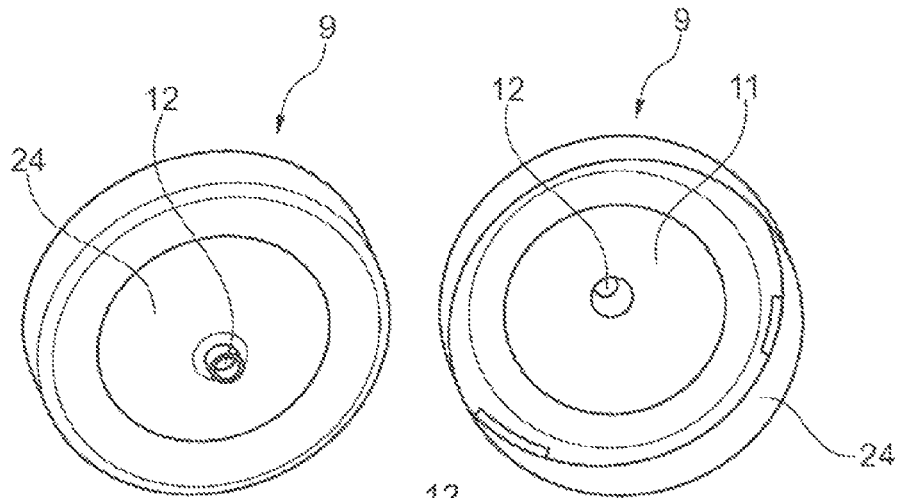
FIG. 5 is a view of the side of the oil distributor cap which is further from the hollow shaft stub, looking onto the same.
FIG. 6 is a view of the oil distributor cap from the side of the hollow shaft stub.
Figure 4:
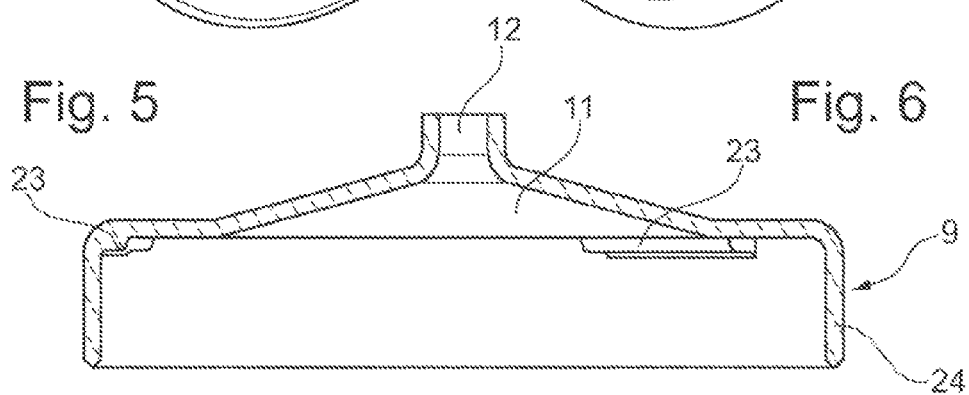
FIG. 4 is a further illustration of the oil distributor cap shown in FIG. 3.
Figure 7:
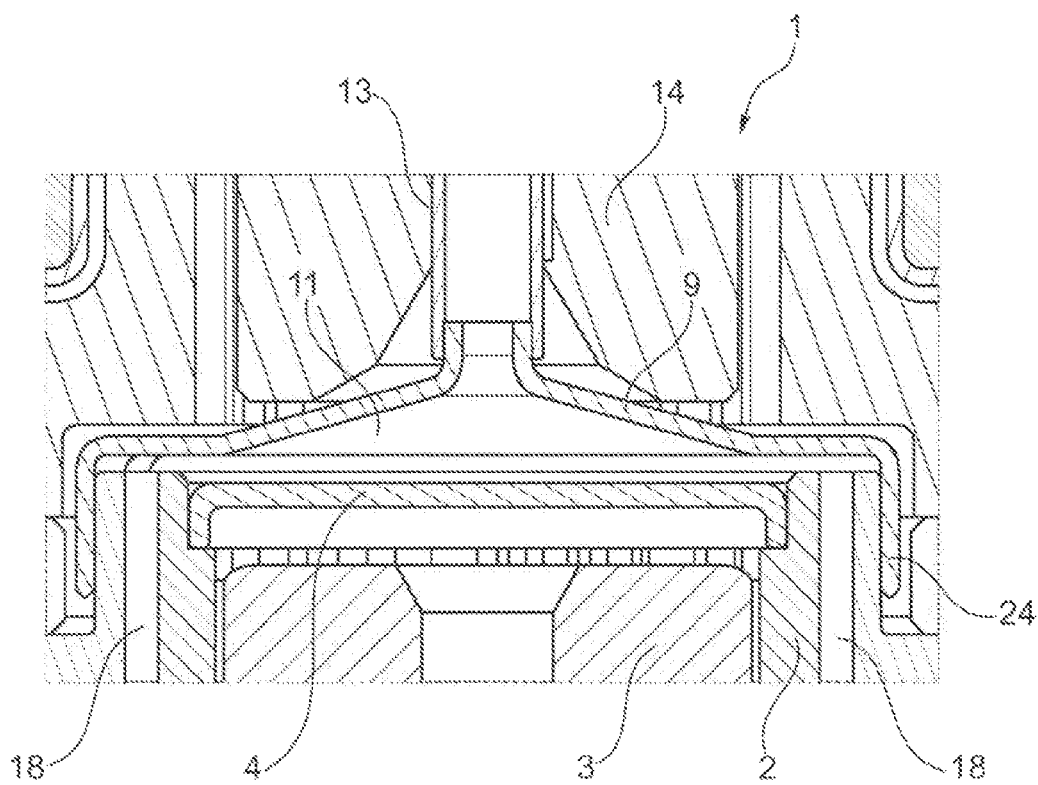
FIG. 7 is an enlarged illustration of an end face of the hollow shaft stub, with the oil distributor cap shown in FIGS. 3 to 6 placed thereon.

It can be easily seen in FIG. 2 that oil distributor caps 18 are constructed on both sides of axis of rotation 21, and run parallel to the same. Hollow shaft stub 2 is designed as a sun gear. The end face of shaft 3 is indicated by reference number 22.

As can be seen in FIGS. 3 to 6, oil distributor cap 9 has funnel-like depression 11 which transitions into oil outlet opening 12.

Projections 23 are constructed at three points on the inner side of oil distributor cap 9 in order to prevent oil distributor cap 9 from sitting flat against the end faces of oil channels 18.

Oil distributor cap 9 has flange region 24 which surrounds end face 5 of hollow shaft stub 2 and which sits flush on the outer side of hollow shaft stub 2 with a press fit.

It is also hereby noted that recesses can also be formed in the material of the oil distributor cap, in the place of projections 23, or a combination of recesses and projections 23 can be used.

Oil distributor cap 9 is positioned inside tube 13, with an allowance for play. However, tube 13 is pressed into hollow shaft 14.

Figure 8:
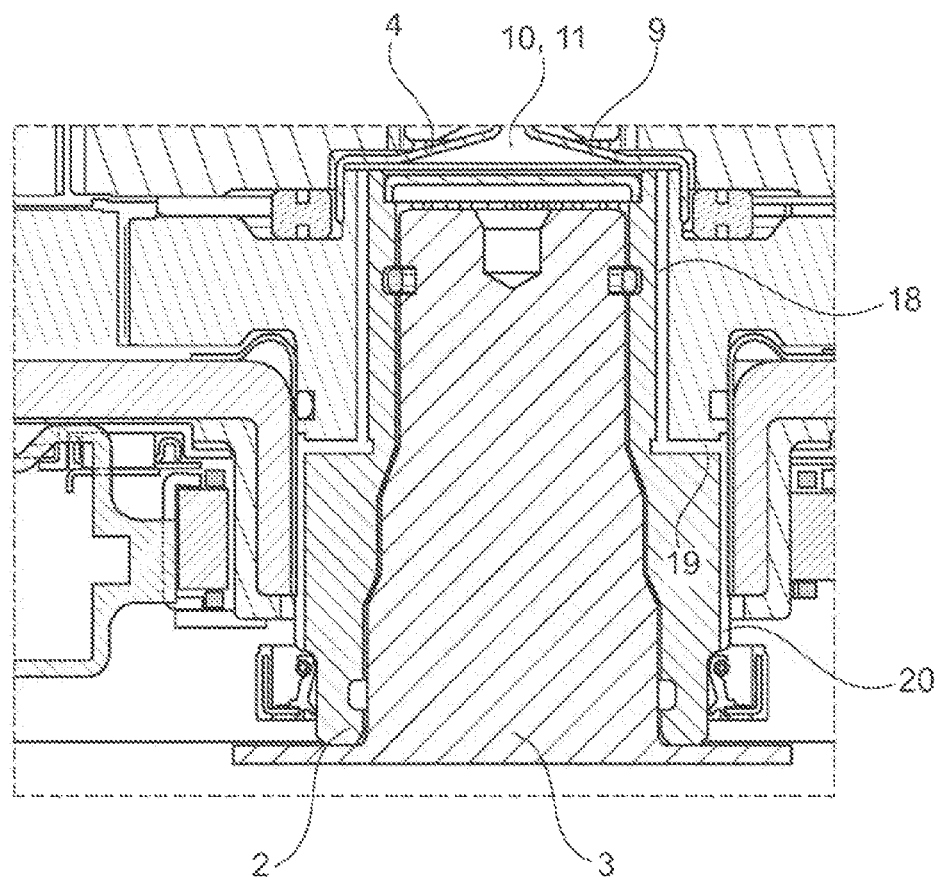
FIG. 8 is a further longitudinal cross-section drawing of the insert shaft system shown in FIGS. 1, 2, and 7, with oil grooves on the outer side of the hollow shaft stub.

FIG. 8 shows the feed of oil through oil groove 20 into connection channel 19 and then into oil channel 18, wherein the oil then penetrates into funnel-like depression 11 in oil distributor cap 9—that is, into oil distribution chamber 10.

Figure 9:
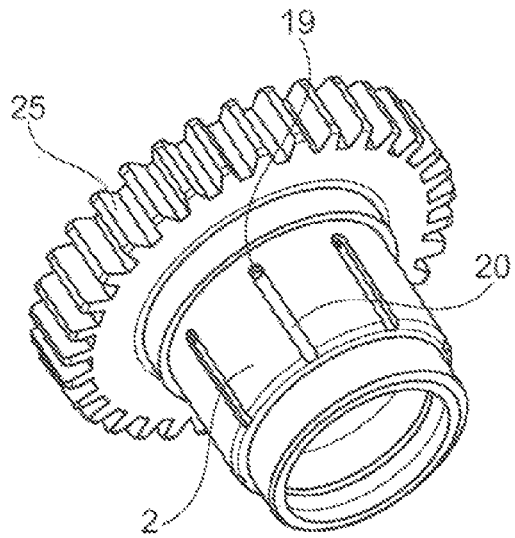
FIG. 9 is a design of the hollow shaft stub of the embodiments shown in FIGS. 1, 2, 7 and 8, as a sun gear, in a perspective drawing mostly from a side which is further from the oil distributor cap; and, FIG. 10 is the sun gear shown in FIG. 9 from an oil distributor cap side.
Figure 10:
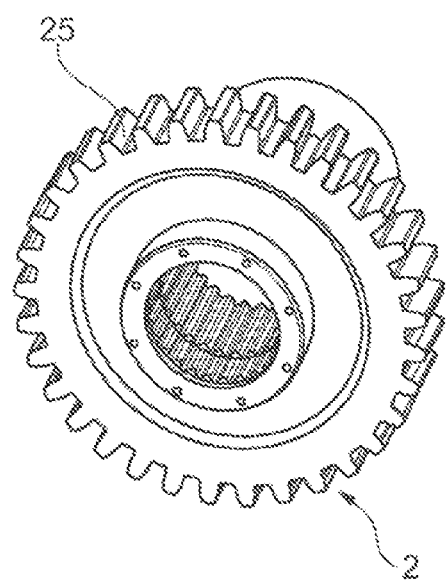

As can be clearly seen in FIGS. 9 and 10, hollow shaft stub 2 has outer toothing 25 on the outer side thereof, in the manner of a sun gear.

The term "oil" in this case is used to mean a hydraulic material which is a fluid. Engine oil, hydraulic oil, and similar oils are included in this context.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

1 Insert shaft system
2 Hollow shaft stub
3 Shaft
4 Seal cap
5 End face of the hollow shaft stub
6 End flange
7 Inner side
8 End face of the seal cap
9 Oil distributor cap
10 Oil distribution chamber
11 Funnel-like depression
12 Oil outlet opening
13 Tube
14 Hollow shaft
15 Groove
16 Retaining element
17 Snap ring
18 Oil channel
19 Connection channel
20 Oil groove
21 Axis of rotation
22 End face of the shaft
23 Projection
24 Flange region
25 Outer toothing

What is claimed is:

1. An insert shaft system, comprising:
   a hollow shaft stub having an interior and an end face;
   a shaft inserted into said interior of said hollow shaft stub in a torque transmitting manner;
   a seal cap attached on said end face of said hollow shaft stub, said seal cap operatively arranged to seal said interior of said hollow shaft stub to prevent a flow of oil through the same; and,
   an oil distributor cap attached at an axial distance from said seal cap on said end face of said hollow shaft stub, said oil distributor cap and said seal cap forming an oil distribution chamber.

2. The insert shaft system recited in claim 1, wherein said oil distributor cap is fixed in said hollow shaft stub, or is attached in a manner surrounding said hollow shaft stub.

3. The insert shaft system recited in claim 1, wherein at least one oil channel, or a plurality of oil channels, flows into said oil distribution chamber, the same preferably being parallel to each other.

4. The insert shaft system recited in claim 1, wherein said oil distributor cap has a funnel-like depression which is preferably arranged centrally.

5. The insert shaft system recited in claim 4, wherein said depression flows into an oil outlet opening.

6. The insert shaft system recited in claim 1, wherein said oil distribution chamber is designed as a gap produced by spacer elements which are pushed through axially in the direction of said end face of said hollow shaft stub.

7. The insert shaft system recited in claim 6, wherein said oil distribution chamber is designed as an annular gap.

8. The insert shaft system recited in claim 1, wherein said oil distributor cap is made of a metallic material such as steel.

9. The insert shaft system recited in claim 1, wherein said hollow shaft stub and said shaft which is designed as a solid shaft are connected to each other via a toothing in a positive- and/or form-fitting manner.

10. The insert shaft system recited in claim 1, wherein said hollow shaft stub is part of a sun gear because said shaft is accommodated in the manner of a sun gear shaft.

11. A differential, such as a spur gear differential, having an insert shaft system recited in claim 1, wherein preferably two sun gears are used.

* * * * *